J. A. STRUTHERS.
ELECTRIC IGNITION SYSTEM.
APPLICATION FILED MAR. 10, 1913.
1,123,621.
Patented Jan. 5, 1915.
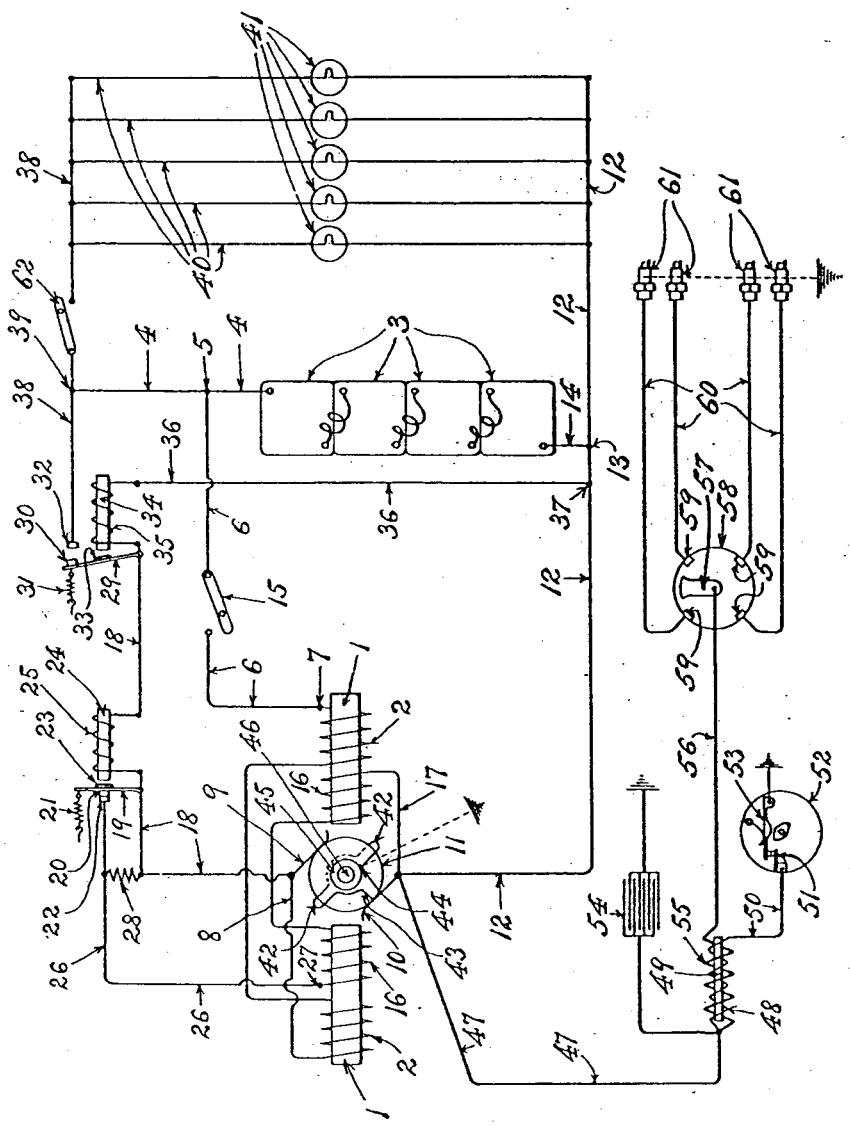
WITNESSES:
Fred'k H. W. Frantzel
Clayton S. Cadmus.
INVENTOR
Joshua A. Struthers,
BY
Frantzel & Richards,
ATTORNEYS

UNITED STATES PATENT OFFICE.

JOSHUA A. STRUTHERS, OF JERSEY CITY, NEW JERSEY, ASSIGNOR TO THE TRI-UNIT ELECTRICAL CO., A CORPORATION OF NEW JERSEY.

ELECTRIC IGNITION SYSTEM.

1,123,621.     Specification of Letters Patent.     Patented Jan. 5, 1915.

Application filed March 10, 1913. Serial No. 753,227.

*To all whom it may concern:*

Be it known that I, JOSHUA A. STRUTHERS, a citizen of the United States, residing at Jersey City, in the county of Hudson and State of New Jersey, have invented certain new and useful Improvements in Electric Ignition Systems, and do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to an improved electrical system adapted to provide operating power and current for engine starting or cranking, lighting and ignition in connection with motor vehicles and their internal combustion engines; and the invention relates, more particularly, to a novel electrical system employing a dynamo electric machine, which, operating in connection with the system, provides a single unit for the accomplishment of the three functions of the system, namely, engine starting, lighting and ignition.

The present invention has for its principal object therefore to provide a novel electric starting, lighting and ignition system for motor vehicles, the said invention providing greater simplicity in the electrical devices and wiring system thereof, unifying or consolidating the functions of an electric generator, motor and magneto in a simple dynamo electric machine, so that the ignition system will always operate independent of battery connection or supply, while cranking or starting the engine, as well as while the same is running, and economizing in the weight and space occupied by the system, and finally reducing very materially the cost of manufacture and installation of the system performing the functions of starting, lighting and ignition for auto vehicles.

On account of the novel unit construction of the dynamo electric machine of the present invention, it is possible to use the same as a motor to start or crank the engine without disturbing its value as a regular ignition magneto for the initial ignition current supply, the same subsequently operating as a generator and magneto combined, thereby charging the storage batteries and at the same time continuing to supply ignition current, the batteries being used for a source of motor current supply and for lighting current supply only.

Other objects of the present invention not at this time more particularly enumerated will be clearly understood from the following detailed description of the present invention.

With the various objects of the present invention in view, the same consists, primarily, in the novel electrical system for supplying operating current for engine starting, ignition and lighting hereinafter set forth; and, furthermore, this invention consists in the novel arrangements, relations and combinations of the various devices and parts and their electrical connections, as well as in the details of the construction and arrangements of the same, all of which will be hereinafter more fully described in the following specification, and then finally embodied in the clauses of the claim which are appended to and which form an essential part of this specification.

The invention is clearly illustrated in the accompanying drawings, in which the novel electrical system for supplying operating current for engine starting, ignition and lighting is illustrated in electrical diagrammatic representation.

Referring now to the said drawing, the reference-character 1 indicates the field cores of the novel dynamo electric machine element employed with the novel electrical system embodying the principles of the present invention. These field cores are preferably made of semi-steel so that the same may be magnetically charged to retain a certain amount of residual magnetism for the purposes subsequently to be disclosed. The said field-cores 1 are provided with a motor series field winding 2.

The reference-character 3 indicates a set of storage batteries, comprising, preferably, a plurality of cells coupled in series. Connected with one pole of said set of batteries 3 is a wire conductor 4. Electrically joining said wire conductor 4, at 5, is a wire conductor 6 which is connected electrically with one end 7 of said motor series field winding 2. The other end 8 of said motor series field winding 2 is connected with the commutator brush 9 of the armature 11. Connected with the other commutator brush 10 of the armature 11 is a wire conductor 12, to which is electrically joined at 13 the return wire conductor 14 leading to the opposite pole of said battery set 3.

A circuit controlling switch mechanism 15 is connected in the conductor 6, or at any other suitable or convenient point in the battery-motor field winding circuit just described.

In addition to said motor series field winding 2 said field cores 1 are provided with a generator field winding 16, one end 17 of the same being connected with said commutator brush 10 of the armature 11. Connected with said commutator brush 9 of the armature 11 is a generator circuit wire or conductor 18. Connected in the line of said generator circuit wire or conductor 18 is a normally closed regulator switch mechanism comprising a pivotal switch-arm 19 connected electrically with said circuit wire or conductor 18, the same being provided with a contact piece 20, and a spring, or other suitable device, 21 connected with said switch-arm 19 for the purpose of maintaining said contact piece 20 in normally closed contact with a stationary contact piece 22. Said switch-arm 19 is further provided with an armature piece 23. Mounted adjacent to said switch-arm 19 is a magnet core 24, the same being wound with a magnetizing coil 25 the terminals of which are electrically connected in said circuit formed by the wire or conductor 18. Connected with said stationary contact-piece 22 is a wire conductor 26 which connects electrically with the other end 27 of said generator field winding 16, thus making said generator field winding shunt wound with relation to the armature 11 and, the external generator circuit. A bridging fixed resistance 28 is connected between said circuit wire or conductor 18 and said wire conductor 26. Also connected in the line of said generator circuit wire or conductor 18 is a normally open regulator switch mechanism comprising, a pivotal switch-arm 29 connected electrically with said circuit wire or conductor 18, the same being provided with a contact piece 30, and a spring, or other similar device, 31 connected with said switch-arm 29 for the purpose of maintaining said contact piece 30 normally separated from electrical contact with a stationary contact-piece 32. Said switch-arm 29 is further provided with an armature-piece 33. Mounted adjacent to said switch-arm 29 is a magnet-core 34, the same being wound with a magnetizing coil 35 one terminal of which is electrically connected with said generator circuit wire or conductor 18, and the other terminal of which connects electrically with a return circuit wire or conductor 36 which joins said wire or conductor 12, at 37, through which the generator circuit is returned or completed to the commutator brush 10 of the armature 11. Connected with said stationary contact-piece 32 is a wire conductor 38, to which is electrically joined at 39 the wire conductor 4 leading to one pole of the battery set 3.

Connected by the wiring 40 between the wire conductor 38 and the wire conductor 12 are a plurality of lamps 41 which are thus connected both in the external generator circuit and the storage battery circuit. One or more cut-out switch mechanisms, as 62, may be provided for controlling the opening or closing of the lamp circuits, as will be clearly understood.

The armature 11 of the dynamo electric machine is of ordinary construction as far as the functions of its motor and generator windings or coils are concerned, said windings or coils being connected with the segments of the armature commutator in the usual manner, but the said armature is provided, in addition to the usual windings or coils, with a single winding or coil which may be termed the magneto winding or coil, as indicated at 42, which serves to supply magneto-generated current to an ignition system. This magneto winding or coil 42 is connected by one of its terminals or ends 43 with a single segment of the commutator of the armature, the opposite terminal or end 44 of the same being grounded upon the armature core 45 and armature-shaft 46. The magneto current delivered to the segment of the armature commutator, to which the said magneto winding or coil 42 is connected, is collected therefrom by the commutator brush 10 and passes therefrom along the primary circuit wire or conductor 47 of the ignition system to the primary winding 48 of the transformer coil 49, the opposite end of said primary winding of said transformer coil 49 being connected by the wire conductor 50 to the stationary contact member 51 of the make and break or interrupter device 52, the movable arm 53 of which is connected with ground, so that the primary circuit is returned through ground to the grounded end of said magneto winding or coil 42. Connected with said transformer coil 49 is the usual condenser 54. The secondary winding 55 of said transformer coil 49 is connected with the secondary circuit wire or conductor 56 leading to the rotary brush 57 of the distributer 58. Connected with the contact members 59 of the said distributer are the secondary circuit wires or conductors 60 leading to the spark plugs or terminals 61 connected with the engine cylinders, the latter being connected in ground so that said secondary current returns or is completed through ground to the grounded end or terminal of said magneto winding or coil 42.

Having thus described in detail the component parts of the electrical system and their electrical connections, the whole embodying the principles of the present invention, it remains to set forth the principles of its operation in the performance of the several functions the same is constructed to serve. Taking up then its performance when operating to crank or start the engine it will be assumed that the storage batteries 3 are stored with the requisite amount of electrical energy. By closing the switch mechanism 15 the battery current flows through the conductor 6 into the motor field windings 2 and excites the field cores 1 to exert the magnetic pull upon the armature 11 to rotate the same and its shaft 46, the circuit being completed through the armature and its commutator back to the batteries 3 through the conductors 12 and 14. The shaft 46 of the dynamo electric machine may be mechanically connected and disconnected at will with the crank-shaft or fly-wheel of an internal combustion engine. When the dynamo electric machine is operating as a motor its shaft 46 serves as a prime mover for the purpose of starting or cranking an internal combustion engine. When the shaft 46 of the dynamo electric machine is mechanically driven, the machine serves as a dynamo or generator for generating current to recharge storage-batteries, and to supply current for ignition purposes.

One of the novel features of the present invention lies in the combination with or consolidation in the dynamo electric machine of the system of means equivalent to magneto-generation of ignition current which operates at all times, whether the dynamo electric machine is performing either the function of a motor or a generator, hence when the dynamo electric machine is operating as a motor the said magneto generating elements thereof will operate to furnish current to an ignition system for an internal combustion engine.

As above stated, said field-cores 1 of the motor-generator are made of semi-steel and are charged with a certain amount of residual magnetism. As the armature 11 is rotated under the magnetic pull of field cores 1, which is induced by the motor-field windings 2, as excited by the storage battery current flowing therethrough, the special magneto winding or coil 42 connected with said armature 11 is also rotated and caused to pass through the flux of lines of residual magnetism flowing from pole to pole of the field cores, thereby cutting the same and generating a magneto primary current which is collected by the commutator brush 10 and passed along the wire or conductor 47 to the transformer coil 49 and condenser 54, said primary current being interrupted or broken by the mechanical operation of the make and break or interrupter 52, so that the high tension secondary current is induced in said transformer coil and passed to said distributer 58, whereby the same is properly distributed to the spark terminals or plugs 61. When the switch-mechanism 15 is thrown to break the motor supply current from the battery set 3, and the armature shaft 46 is mechanically driven, the said armature 11 is mechanically rotated thereby, so as to cause the dynamo electric machine to now operate as a dynamo or generator for the purpose of generating direct current for restoring the battery set 3, and when desirable to supply lighting current direct to the lamps 41. The generator field winding 16 of the field cores 1 being shunt wound in connection with the armature and external generator circuit, it will, of course, be gradually excited to produce the proper flux of magnetic lines from pole to pole of the field cores to be cut by the armature windings, so that the circuit leading from bush to bush of the commutator will soon receive the desired flow of current.

The proper charging of the batteries 3 is automatically regulated and controlled by the normally closed and normally open regulator switches connected in the external circuit leading from the generator. These controlling devices are set or arranged to operate to pass current to the batteries or lights when the speed of the car becomes approximately ten miles an hour, although this is subject to variation so that the normal operation or flow of the generator circuit will take place at any other desired speed. When the car is running under ordinary conditions at ten miles per hour for example, the generator armature 11 will be driven at a speed to produce a voltage sufficient to charge the battery 3 or supply lighting current to the lamps 41. When the car runs at a lower speed the generator circuit is completed through the conductors 18, 36 and 12, and is therefore by-passed and does not flow to batteries 3 because the normally open regulator switch which controls the flow of the same to the said batteries or lamps remains open. When, however, the voltage generated by the dynamo or generator becomes high enough for charging the batteries or lighting the lamps, the coil 35 on the magnet core 34 is sufficiently excited to induce enough magnetism in said core 34 to attract thereto the armature 33 of the pivotal switch-arm 29, thereby moving said switch-arm to carry its contact-piece 30 into circuit closing contact with said stationary contact-piece 32, thus permitting the generated current to flow to the batteries 3 through the conductors 18, 38 and 4, the circuit being completed through the conductors 14 and 12. Thus the generator begins to charge the batteries 3, or, if the switch mechanism 62 is closed, the current may flow to the lamps 41. Of course, it will be evident that the voltage generated by the generator will increase as the speed of the armature of the generator increases unless a method of controlling or regulating the same is provided; it is therefore desirable to provide such a regulating means so that the generated voltage may be governed and maintained at the desired amount even when the vehicle is running from fifteen to sixty miles an hour and consequently the engine speed is greatly increased, since, if the voltage of the generator were allowed to increase uncontrolled, it would result in an excess of the required voltage tending to cause excessive sparking at the commutator brushes, excess current in amperes and consequent commutator trouble, undue wear and heating of the generator bearings, and overcharging of the batteries 3 which would be detrimental thereto. In order to guard against these detrimental effects the said normally closed regulator switch mechanism is provided and serves, by its operation, to decrease the strength or excitation of the generator field winding, a consequent decrease of the flux of magnetic lines traveling from pole to pole of the field-cores 1 and therefore a decrease in the output of current flowing into the generator circuit occurs. This result is attained as follows:—If the generator current passing into the coil 25 of the magnet core 24 reaches a certain height in its flow, say for example ten amperes which would be the usual practice, the current in excess is sufficient to charge said coil 25 enough to magnetize the core 24 so that it will attract the armature member 23 of the pivotal switch-arm 19, swinging or moving the latter to carry its contact-piece 20 away from circuit closing contact with said stationary contact-piece 22 so that the resistance member 28 is inserted in the shunt circuit of the said generator field windings 16, the resistance offered thereby to the flow of exciting current in the shunt circuit decreasing the same and weakening the field cores 1, so that the lines of magnetic flux passing from pole to pole of the field cores 1 are reduced, and consequently the amount of current generated and delivered through the generator circuit is also decreased. This operation results in lessening the current delivered to the batteries or lights, as the case may be. When the current is lessened to the normal or predetermined amount, the coil 25 does not magnetize the magnet core 24 enough to overcome the pull or tension of spring 21 connected with said switch-arm 19, and consequently said spring pulls the switch-arm 19 back to its normal initial position, again closing the contact of said contact pieces 20 and 22 and permitting the full flow of current through the shunt circuit of the generator field winding unobstructed by said resistance 28, so that the full strength of the field cores is restored, and consequently the generated current tends to increase again in the generator circuit. Under ordinary operating conditions the said switch-arm 19 will vibrate in this manner so rapidly as to maintain the generated current normal or constant. In the event the engine speed becomes so low that the generator cannot deliver enough current to charge the batteries 3 or furnish power to the lamps 41, the magnetism of the core 34 caused by the current flowing through its coil 35 is so weakened that it cannot hold said switch-arm 29 and its contact-piece 30 in circuit closing contact with the stationary contact piece 32 against the pull or tension of the spring 31; consequently the current is interrupted or broken, and is by-passed through the conductors 36 and 12 back to the generator until the current is restored to proper strength for battery charging or lighting. In the event the lights are burning or operating at such time the battery current will automatically take up the burden of supplying the same with current necessary to their operation. While the said dynamo electric machine is performing its functions of a generator in the manner above described, it must be understood that the magneto coil 42 of the armature 11 continues constantly to supply magneto generated ignition current to the ignition system in the manner also above described, said magneto function of the motor continuing uninterrupted both when the dynamo electric machine serves as a motor and as a generator.

The said motor field winding 2 is of a comparatively coarse gage of wire, preferably number 2, and the said generator field winding 16 is of a finer gage of wire, preferably number 24. In the same manner, the ordinary armature coils or windings are of coarser wire than the magneto coil or winding 42, the former being preferably of number 14 gage and the latter being preferably of number 27 gage. Of course, I do not limit myself to the use of such gages in the respective windings, but merely offer the same as an example of comparative winding values found serviceable, since the same may each or all be varied according to the circumstances of use or the capacity desired of the respective elements of said dynamo electric machine. It will be also clearly understood that I do not limit myself to the exact arrangement of interconnecting conductors leading between the several elements of the novel system embodying the principles of this invention, but hold to be within the spirit and scope of my invention any arrangement of interconnecting conductors by means of which the novel correlation of the said several elements and circuit of the system may be maintained so as to properly serve the functions of starting or cranking an internal combustion engine, furnishing current for electric lights, and ignition current.

I claim:—

1. In an electric system, a dynamo electric machine provided with a motor field winding and an independently wound generator field winding, an armature having a commutator, a magneto armature winding upon said armature independent of the ordinary winding of the latter, and a sparking-circuit electrically connected through certain of the segments of said commutator of said armature with said magneto armature winding and leading to the spark-plug of an internal combustion engine, said sparking-circuit being energized from said magneto armature winding when said dynamo electric machine is operated as a motor, for initial sparking, and said sparking circuit continuing to be energized from said magneto armature winding when the dynamo electric machine is driven as a dynamo.

2. In an electric system of the kind described, a dynamo electric machine, a storage battery set, means connecting said storage battery set in series with said dynamo electric machine to operate the same as a motor, means connecting said storage battery set in circuit with said dynamo electric machine to receive the generated current therefrom, a plurality of electric lamps connected in the supply circuit of said dynamo electric machine, means connected with the armature of said dynamo electric machine for generating a magneto induced ignition current upon the rotation of said armature, and an ignition circuit system for delivering said magneto induced ignition current to the spark-plugs of an internal combustion engine.

3. In an electric system of the kind described, a dynamo electric machine provided with field-cores having residual magnetism, a motor field-winding connected with said field-cores, a generator field-winding connected with said field cores, an armature rotatably mounted between the poles of said field-cores, a storage battery set, a motor circuit leading between said motor field winding and said storage battery set, means for opening and closing said motor circuit, a generator circuit connected with said armature, a shunt circuit connecting said generator field winding with said generator circuit, a normally closed automatic regulator switch between said generator circuit and said shunt circuit of the generator field-winding, a fixed resistance between said generator circuit and said shunt circuit operating when said normally closed automatic regulator switch is opened, means connecting said battery set in said generator circuit, a normally open automatic regulator switch connected in said generator circuit for controlling the flow current to said battery set, a lighting circuit connected in common with said battery set and said generator circuit, means for opening and closing said lighting circuit, means connected with said armature of said dynamo electric machine for generating a magneto induced ignition current, and an electrical ignition system supplied by said magneto induced ignition current.

4. In an electric system of the kind described, a dynamo electric machine provided with field-cores having residual magnetism, a motor field-winding connected with said field-cores, a generator field-winding connected with said field-cores, an armature rotatably mounted between the poles of said field-cores, a storage battery set, a motor circuit leading between said motor field winding and said storage battery set, means for opening and closing said motor circuit, a generator circuit connected with said armature, a shunt circuit connecting said generator field winding with said generator circuit, a normally closed automatic regulator switch betwee said generator circuit and said shunt circuit of the generator field-winding, a fixed resistance between said generator circuit and said shunt circuit operating when said normally closed automatic regulator switch is opened, means connecting said battery set in said generator circuit, a normally open automatic regulator switch connected in said generator circuit for controlling the flow current to said battery set, a lighting circuit connected in common with said battery set and said generator circuit, means for opening and closing said lighting circuit, a magneto armature winding on said armature one end of the same being grounded on the armature core and the other end connected with a segment of the armature commutator, said magneto armature winding being adapted to cut the flux of residual magnetism flowing from pole to pole of said field cores to generate a magneto induced current, and an electrical ignition system supplied by said magneto induced ignition current.

5. In an electrical system of the kind described, a dynamo electric machine comprising field cores having residual magnetism, a motor field winding and a generator field winding on said field cores, a rotatable armature shaft, an armature core mounted on said shaft provided with ordinary armature windings, a commutator connected with said armature, windings, commutator brushes engaging said commutator, a storage battery set, connected in series with said motor-generator field winding, a generator circuit leading from said commutator brushes, means connecting said storage battery set in said generator circuit, a magneto armature winding mounted on said armature core, one end of said magneto armature winding being grounded on said armature core and the other end of the same being connected with a segment of said commutator, said magneto armature winding being adapted to cut the flux of residual magnetism flowing from pole to pole of said field cores to generate a magneto induced current, when said armature rotates, and an electrical ignition system connected with one brush of said commutator supplied by said magneto induced ignition current.

6. In an electrical system of the kind described, a dynamo electric machine comprising field cores having residual magnetism, a motor field winding and a generator field winding on said field cores, a rotatable armature shaft, an armature core mounted on said shaft provided with ordinary armature windings, a commutator connected with said armature windings, commutator brushes engaging said commutator, a storage battery set connected in series with said motor-generator field winding, a generator field circuit leading from said commutator brushes, means connecting said storage battery set in said generator circuit, a magneto armature winding mounted on said armature core, one end of said magneto armature winding being grounded on said armature core and the other end of the same being connected with a segment of said commutator, said magneto armature winding being adapted to cut the flux of residual magnetism flowing from pole to pole of said field cores to generate a magneto induced current when said armature rotates, an electrical ignition system connected with one brush of said commutator supplied by said magneto induced ignition current, and an electric lighting circuit connected in common with said external generator circuit and with said storage battery set.

7. In an electrical system of the kind described, a dynamo electric machine provided with field-cores having residual magnetism, a motor field winding and a generator field winding on said field cores, a rotatable armature shaft, an armature core mounted on said shaft provided with ordinary armature windings, a commutator connected with said armature windings, commutator brushes engaging said commutator, a storage battery set, a motor circuit leading between said motor field winding and said storage battery set, means for opening and closing said motor circuit, a generator circuit connected with said commutator brushes of said armature, a shunt circuit connecting said generator field winding with said generator circuit, a normally closed automatic regulator switch between said generator circuit and said shunt circuit of said generator field winding, a fixed resistance between said generator circuit and said shunt circuit operating when said normally closed automatic regulator switch is opened, means connecting said battery set in said generator circuit, a normal open automatic regulator switch connected in said generator circuit for controlling the flow of current to said battery set, a magneto armature winding mounted on said armature core, one end of said magneto armature winding being grounded on said armature core and the other end of the same being connected with a segment of said commutator, said magneto armature winding being adapted to cut the flux of residual magnetism flowing from pole to pole of said field cores to generate a magneto induced current when said armature rotates, and an electric ignition system connected with one brush of said commutator supplied by said magneto induced ignition current.

In testimony, that I claim the invention set forth above I have hereunto set my hand this 6th day of March, 1913.

JOSHUA A. STRUTHERS.

Witnesses:
FREDK. C. FRAENTZEL,
FREDK. H. W. FRAENTZEL.